US005735567A

United States Patent [19]
Mora, Sr.

[11] Patent Number: 5,735,567
[45] Date of Patent: Apr. 7, 1998

[54] WIND DEFLECTOR APPARATUS FOR USE IN A BED OF A PICKUP TRUCK

[76] Inventor: Robert Mora, Sr., 7642 Leucite Ave., Rancho Cucamonga, Calif. 91730

[21] Appl. No.: 833,255

[22] Filed: Apr. 4, 1997

[51] Int. Cl.$^6$ ............................................. B67D 35/00
[52] U.S. Cl. ............................... 296/180.1; 296/57.1
[58] Field of Search ........................ 296/180.1, 180.5, 296/57.1, 37.6

[56] References Cited

U.S. PATENT DOCUMENTS

| 4,506,870 | 3/1985 | Penn | 296/180.1 |
| 4,585,263 | 4/1986 | Hesner | 296/180.1 |
| 4,884,838 | 12/1989 | Slater | 296/180.1 |
| 5,069,498 | 12/1991 | Benchoff | 296/180.1 |
| 5,498,058 | 3/1996 | Kuo | 296/180.1 |

*Primary Examiner*—Gary C. Hoge

[57] ABSTRACT

A wind deflector apparatus for use in a bed of a pickup truck for reducing air pressure and wind drag forces created in the bed of the pickup truck when it is moving forward including a generally rectangular planar back panel; a generally rectangular planar front panel; a pair of side panels slidably sandwiched between the back panel and front panel; a side panel coupling mechanism for coupling the side panels between the back panel and front panel and yet allowing opposing and outward longitudinal slidable movement of the side panels with respect to both the front panel and back panel in an extended position for use in deflecting air and allowing inward longitudinal slidable movement of the side panels with respect to both the front panel and back panel in a retracted position for stowage; and a deflector coupling mechanism for pivotally coupling the back panel to a bed of a pickup truck at a location near the tailgate whereby the front panel and back panel extend across the bed such that the deflector can be positioned against the tailgate in a stowed configuration or positioned at an angle away from the tailgate in an operable configuration with the side panels placed in an extended configuration.

3 Claims, 4 Drawing Sheets

WIND DEFLECTOR APPARATUS FOR USE IN A BED OF A PICKUP TRUCK

BACKGROUND OF THE INVENTION

1. Field of the Invention

The present invention relates to a wind deflector apparatus for use in a bed of a pickup truck and more particularly pertains to reducing air pressure and wind drag forces created in the bed of a pickup truck when it is moving forward with a wind deflector apparatus for use in a bed of a pickup truck.

2. Description of the Prior Art

The use of pickup truck air foil apparatuses is known in the prior art. More specifically, pickup truck air foil apparatuses heretofore devised and utilized for the purpose of reducing air pressure and wind drag forces in a bed of a moving pickup truck are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,411,312 to Stallings discloses a tailgate wind deflector apparatus. U.S. Pat. No. 5,232,259 to Booker discloses a truck bed air deflecting tool box. U.S. Pat. No. 5,069,498 to Benchoff discloses a pickup truck retractable endgate airfoil. U.S. Pat. No. 4,884,838 to Slater discloses a combined airfoil and loading ramp for a pickup truck. U.S. Pat. No. 4,585,263 to Hesner discloses an air deflector. U.S. Pat. Des. No. 351,819 to Baddeley discloses a combined pickup truck air deflector and storage cover.

While these devices fulfill their respective, particular objective and requirements, the aforementioned patents do not describe a wind deflector apparatus for use in a bed of a pickup truck that has extendable panels that can be slidably and adjustably positioned across the bed of a pickup truck at a desired angle for deflecting wind when the pickup truck is moving forward.

In this respect, the wind deflector apparatus for use in a bed of a pickup truck according to the present invention substantially departs from the conventional concepts and designs of the prior art, and in doing so provides an apparatus primarily developed for the purpose of reducing air pressure and wind drag forces created in the bed of a pickup truck when it is moving forward.

Therefore, it can be appreciated that there exists a continuing need for new and improved wind deflector apparatus for use in a bed of a pickup truck which can be used for reducing air pressure and wind drag forces created in the bed of a pickup truck when it is moving forward. In this regard, the present invention substantially fulfills this need.

SUMMARY OF THE INVENTION

In the view of the foregoing disadvantages inherent in the known types of pickup truck air foil apparatuses now present in the prior art, the present invention provides an improved wind deflector apparatus for use in a bed of a pickup truck. As such, the general purpose of the present invention, which will be described subsequently in greater detail, is to provide a new and improved wind deflector apparatus for use in a bed of a pickup truck and method which has all the advantages of the prior art and none of the disadvantages.

To attain this, the present invention essentially comprises, in combination, a rigid rectangular back panel. The back panel has a smooth planar exterior surface and a smooth planar interior surface interconnected by a periphery formed of a long horizontal top edge, a long horizontal bottom edge, and a pair of short side edges extended therebetween. The interior surface of the back panel has two pairs of parallel and horizontally aligned longitudinal slots formed thereon with each slot of each pair extended linearly from one of the side edges to a location offset from a central portion of the back panel. The back panel also has a pair of horizontally aligned bores disposed thereon at a location offset from a central portion of the bottom edge.

A pair of rigid and generally rectangular side panels are also provided. Each side panel has a smooth planar first surface and a smooth planar second surface interconnected by a periphery formed of a short top edge with an upper lip formed thereon and extended away from the first surface, a short bottom edge with a lower lip formed thereon and extended therefrom and away from the first surface, and long inboard and outboard side edges extended therebetween. The outboard side edge of each side panel has a side lip formed thereon and extended away from the first surface. The upper lip and the lower lip of each side panel are separately and slidably disposed within a respective pair of slots on the back panel such that each side panel is positioned in a co-planar arrangement with the back panel and in contact therewith. Each side panel can be slidably extended outward with respect to the back panel to define an extended position. Each side panel can also be slidably extended inward with respect to the back panel to define a retracted position.

A rigid rectangular front panel of a length and a width generally equal to that of the back panel is also included. The front panel has a smooth planar exterior surface and a smooth planar interior surface interconnected by a periphery formed of a long horizontal top edge, a long horizontal bottom edge, and a pair of side edges extended therebetween. The front panel has a pair of integral parallel linear rails extended outwards from the interior surface thereof and at a position parallel with the side edges thereof, and a pair of horizontally aligned bores disposed thereon at a location offset from a central portion of the bottom edge. Each bore is positioned in axial alignment with a separate bore on the back panel.

A rigid rectangular planar extension panel is included and has a smooth planar first surface and a smooth planar second surface interconnected by a periphery formed of a long horizontal top edge, a long horizontal bottom edge, and a pair of side edges extended therebetween. The extension panel has first pair of parallel linear slots formed thereon at a position parallel with the side edges thereof, and a second pair of parallel linear slots formed thereon at a position parallel with and between the first pair of slots and in axial alignment with the pairs of bores of the front panel and back panel. The extension panel is sandwiched between and in slidable contact with the second surfaces of the side panels and interior surface of the front panel. The rails of the front panel are separately and slidably disposed within the slots of the first pair on the extension panel whereby the extension panel can be extended downward and away from the front panel and the back panel in an extended position and retracted toward the front panel and back panel in a retracted position.

Further provided is a pair of rigid bolts. The bolts are disposed through the bores of the front panel and back panel and second pair of slots of the extension panel. Each bolt is secured with a wing nut to hold the panels in a fixed position when the nuts are tightened or hold the panels in juxtaposition when the nuts are loosened.

Lastly, a deflector coupling mechanism is provided for pivotally coupling the back panel near the top edge thereof to a bed of a pickup truck at a location near the tailgate. In this position, the front panel and back panel extend across the bed such that the deflector can be positioned against the tailgate in a stowed configuration or positioned at an angle away from the tailgate in an operable configuration. When placed in the operable position, the side panels and extension panels can be positioned in an extended configuration for use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wind deflector apparatus for use in a bed of a pickup truck which has all the advantages of the prior art pickup truck air foil apparatuses and none of the disadvantages.

It is another object of the present invention to provide a new and improved wind deflector apparatus for use in a bed of a pickup truck which may be easily and efficiently manufactured and marketed.

It is a further object of the present invention to provide a new and improved wind deflector apparatus for use in a bed of a pickup truck which is of durable and reliable construction.

An even further object of the present invention is to provide a new and improved wind deflector apparatus for use in a bed of a pickup truck which is susceptible of a low cost of manufacture with regard to both materials and labor, and which accordingly is then susceptible of low prices of sale to the consuming public, thereby making such a wind deflector apparatus for use in a bed of a pickup truck economically available to the buying public.

Still yet another object of the present invention is to provide a new and improved wind deflector apparatus for use in a bed of a pickup truck which provides, in the apparatuses and methods of the prior art some of the advantages thereof, while simultaneously overcoming some of the disadvantages normally associated therewith.

Even still another object of the present invention is to provide a new and improved wind deflector apparatus for use in a bed of a pickup truck for reducing air pressure and wind drag forces created in the bed of a pickup truck when it is moving forward.

Lastly, it is an object of the present invention to provide a new and improved wind deflector apparatus for use in a bed of a pickup truck comprising a generally rectangular planar back panel; a generally rectangular planar front panel; a pair of side panels slidably sandwiched between the back panel and front panel; side panel coupling means for coupling the side panels between the back panel and front panel and yet allowing opposing and outward longitudinal slidable movement of the side panels with respect to both the front panel and back panel in an extended position for use in deflecting air and allowing inward longitudinal slidable movement of the side panels with respect to both the front panel and back panel in a retracted position for stowage; and a deflector coupling mechanism for pivotally coupling the back panel to a bed of a pickup truck at a location near the tailgate whereby the front panel and back panel extend across the bed such that the deflector can be positioned against the tailgate in a stowed configuration or positioned at an angle away from the tailgate in an operable configuration with the side panels placed in an extended configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
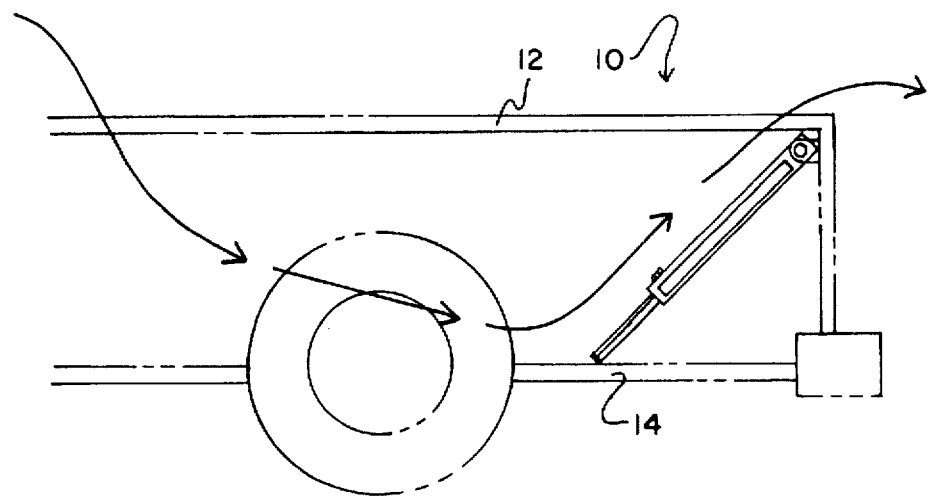
FIG. 1 is a side-elevational view of the preferred embodiment of the present invention in an extended position for use.

With reference now to the drawings, and in particular, to FIG. 1 thereof, the preferred embodiment of the new and improved wind deflector apparatus for use in a bed of a pickup truck embodying the principles and concepts of the present invention and generally designated by the reference number 10 will be described.

The preferred embodiment of the present invention is comprised of a plurality of components. In their broadest context, such components include a back panel, side panels, front panel, extension panel, a panel coupling mechanism for coupling the panels together, and a deflector coupling mechanism for coupling the present invention to and across a bed 12 of a pickup truck 14, with or without an operable tailgate 16.

Specifically, the present invention includes a rigid rectangular plastic back panel 18. The back panel has a smooth planar exterior surface 20 and a smooth planar interior surface 22. The surfaces 20, 22 are interconnected by a periphery 24 formed of a long horizontal top edge 26, a long horizontal bottom edge 28 and a pair of short side edges 30 extended therebetween. The interior surface of the back panel has two pairs of parallel and horizontally aligned rectangular slots 32 formed thereon. Each slot of each pair is extended linearly from one of the side edges 30 to a location offset from a central portion 34 of the back panel. Thus, a slot is located near each corner of the back panel. The back panel further includes a pair of horizontally aligned and circular bores 36 disposed thereon at a location offset from a central portion of the bottom edge.

Figure 3:
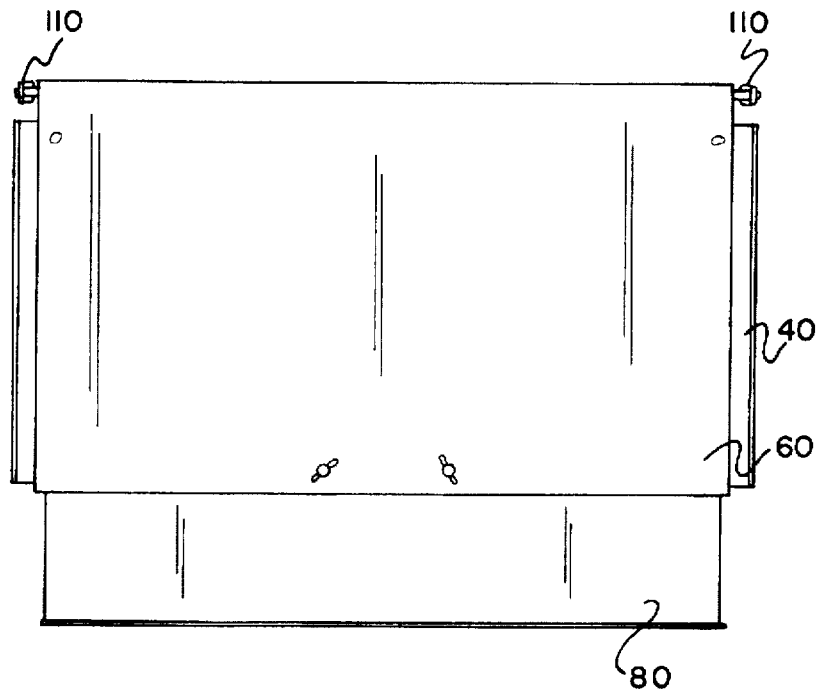
FIG. 3 is a front view of the preferred embodiment of the present invention in the extended position.
Figure 4:
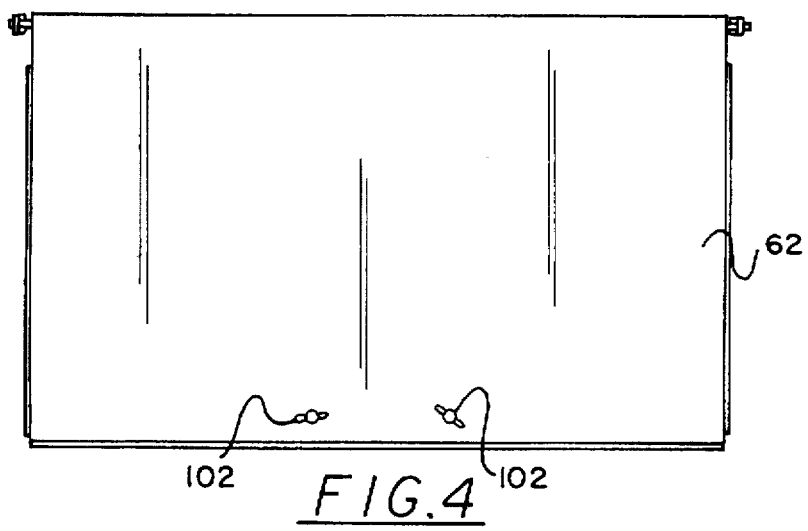
FIG. 4 is a front view of the present invention in the retracted position.
Figure 5:
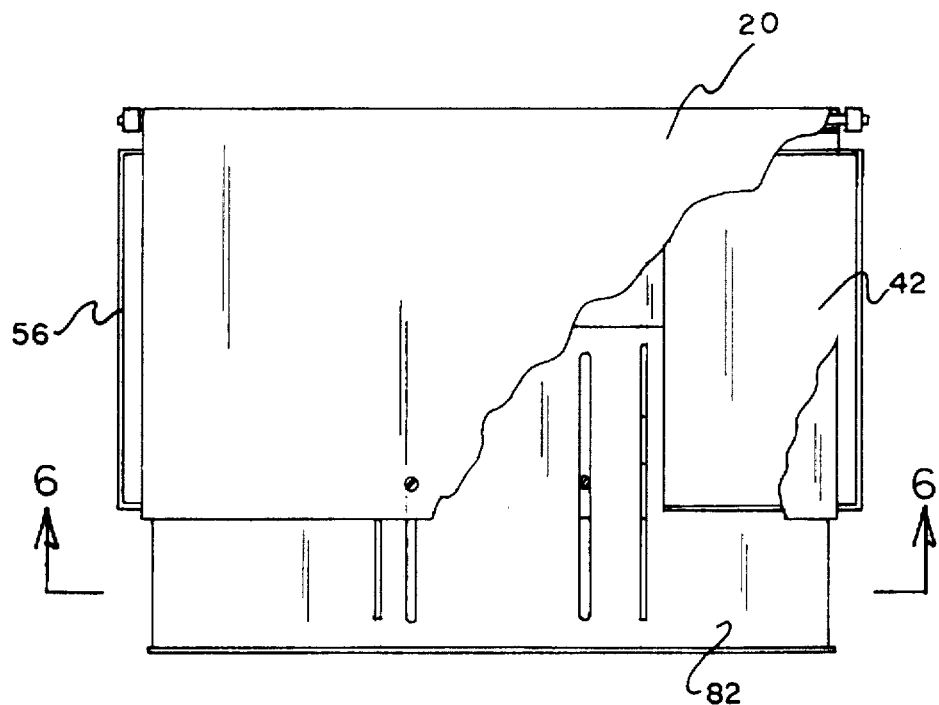
FIG. 5 is a front sectional view of the panels of the present invention.
Figure 6:
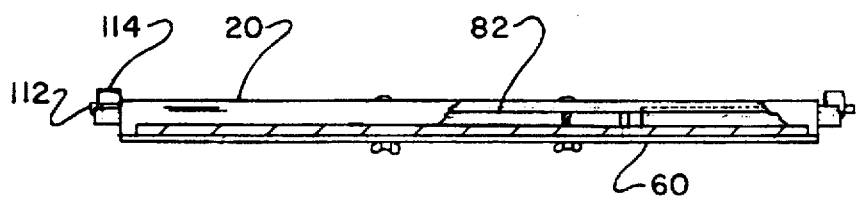
FIG. 6 is a cross-sectional view of the present invention taken along the line 6—6 of FIG. 5.
Figure 7:
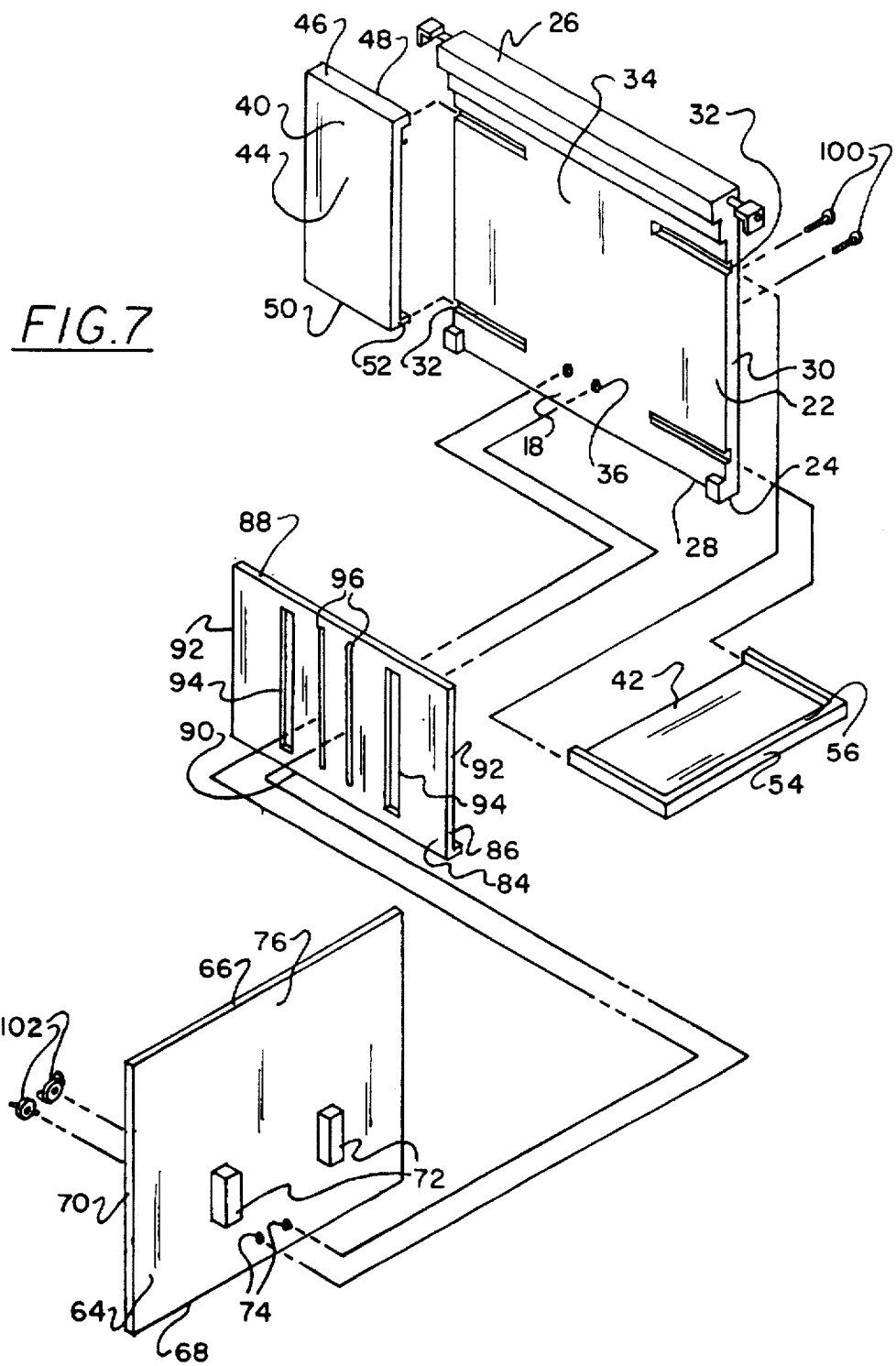
FIG. 7 is an exploded view of the preferred embodiment of the present invention.

Also included is a pair of rigid plastic and generally rectangular side panels 40. Each side panel has a smooth planar first surface 42 and a smooth planar second surface 44. The surfaces 42, 44 are interconnected by a periphery formed of a short top edge 46 with an upper lip 48 formed thereon and extended away from the first surface, a short bottom edge 50 with a lower lip 52 extended therefrom and away from the first surface, and long inboard and outboard side edges 54 extended therebetween. The outboard side edge has a side lip 56 formed thereon. The side lip is extended away from the first surface and interconnected with the upper and lower lips to form a border. The upper lip 48 and the lower lip 52 of each panel are separately and slidably disposed within a respective pair of slots 30 on the back panel. In this configuration each side panel is positioned in a coplanar arrangement with the back panel and in contact therewith. Each side panel can be slidably extended outward with respect to the back panel to define an extended position as shown in FIG. 3. Each side panel can also be slidably extended inward with respect to the back panel to define a retracted position as shown in FIG. 4.

The present invention also includes a rigid rectangular plastic front panel 60. The front panel is of a length and a width that is generally equal to that of the back panel 18. The front panel has a smooth planar exterior surface 62 and a smooth planar interior surface 64. The surfaces 62, 64 are interconnected by a periphery formed of a long horizontal top edge 66, a long horizontal bottom edge 68, and a pair of side edges 70 extended therebetween. Furthermore, a pair of integral parallel linear rails 72 are extended outwards from the interior surface 64 of the front panel and are positioned at a location parallel with the side edges 70. Also provided is a pair of horizontally aligned bores 74. The bores 74 are disposed on the front panel at a location offset from a central portion 76 of the bottom edge. Each bore is positioned in axial alignment with a separate bore 36 on the back panel 18.

To allow for coverage of the present invention within various bed depths, a rigid rectangular planar plastic extension panel 80 is included. The panel 80 has a smooth planar first surface 82 and a smooth planar second surface 84. The surfaces 82, 84 are interconnected by a periphery 86 formed of a long horizontal top edge 88, a long horizontal bottom edge 90 and a pair of side edges 92 extended therebetween. The extension panel 80 includes a first pair of parallel linear slots 94 formed thereon at a position parallel with the side edges 92. In addition, a second pair of parallel linear slots 96 are formed on the extension panel 80 at a position parallel with and between the first pair of slots 94. The second pair of slots 96 are positioned in axial alignment with the pairs of bores 36, 74 of the front and back panel, respectively. The first surface 82 of the extension panel is sandwiched between and in slidable contact with the second surface 44 of the side panels and interior surface 64 of the front panel. The rail 72 of the front panel are separately and slidably disposed within the slots 94 of the first pair on the extension panel. The extension panel can be extended downward and away from the front panel 60 and the back panel 18 and in extended position as shown in FIG. 3 and retracted towards the front panel and back panel in a retracted position as shown in FIG. 4.

To couple the panels together, a pair of rigid metal bolts 100 are disposed through the bores 36, 74 of the front panel and the back panel and second pair of slots 92 of the extension panel. Each bolt is secured with a wing nut 102 to hold the panels at a fixed position. The ends of the bolts are then flattened to ensure that the wing nuts do not become disengaged. When the nuts are tightened, they hold the panels in a fixed position. When the nuts are loosened, the panels are placed in juxtaposition with one another to allow for relative movement of the side panels and extension panel.

Figure 2:
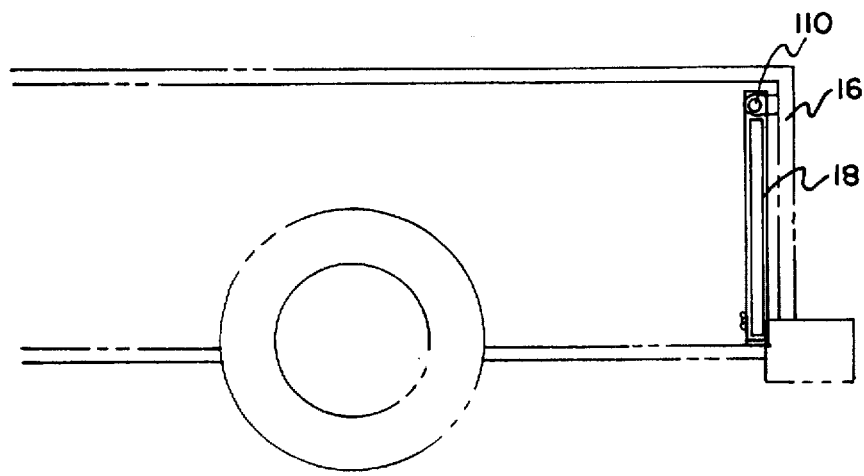
FIG. 2 is a side-elevational view of the preferred embodiment of the present invention in a stowed and retracted position.

Lastly, a deflector coupler mechanism 110 is included. The mechanism 110 is formed of a pair of pins 112 and associated brackets 114. The mechanism 110 is used for coupling the back panel near its top edge to a bed 12 of a pickup truck 14 at a location near the tailgate 16. The brackets 114 are affixed to the bed while the pins 112 are slidably inserted within the brackets. The front panel 60 and the back panel 18 then extend across the bed at an angle substantially perpendicular to the bed's sidewalls such that the deflector 10 can be positioned against the tailgate or near the tailgate opening to define a stowed configuration as shown in FIG. 2 or positioned at an angle away from the tailgate or tailgate opening as shown in FIG. 1 to define an operable configuration, with the side panels and extension panels placed in an extended configuration for use. In an operable configuration, wind generated from the forward motion of the pickup truck is then deflected out of the bed and over the end of the vehicle to thereby reduce drag and improve gasoline mileage.

Another embodiment of the present invention could be fashioned such that the front panel and back panel are formed of one piece. In addition, the front panel and the back panel need not be the same size, as smaller dimensions of either panel can be accommodated as long as support is provided for operation of the side panels and extension panel. In addition, the present invention can also be formed of other rigid materials such as metal or composite fabric material. Furthermore, the panels need not be rectangular in shape as long as they perform the required functions of extending across the bed of a pickup truck to deflect wind when the pickup truck is moving.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A wind deflector apparatus for use in a bed of a pickup truck for reducing air pressure and wind drag forces created in the bed of the pickup truck when it is moving forward, comprising, in combination:

a rigid rectangular back panel having a smooth planar exterior surface and a smooth planar interior surface interconnected by a periphery formed of a long horizontal top edge, a long horizontal bottom edge, and a pair of short side edges extended therebetween, and with the interior surface having two pairs of parallel and horizontally aligned slots formed thereon with each slot of each pair extended linearly from one of the side edges to a location offset from a central portion of the back panel, and with the back panel further having a pair of horizontally aligned bores disposed thereon at a location offset from a central portion of the bottom edge;

a pair of rigid and generally rectangular side panels, each side panel having a smooth planar first surface and a smooth planar second surface interconnected by a periphery formed of a short top edge with an upper lip formed thereon and extended away from the first surface, a short bottom edge with a lower lip extended therefrom and away from the first surface, and long inboard and outboard side edges extended therebetween wherein the outboard side edge has a side lip formed thereon and extended away from the first surface, and wherein the upper lip and the lower lip of each side panel are separately and slidably disposed within a respective pair of slots on the back panel such that each side panel is positioned in a co-planar arrangement with the back panel and in contact therewith and wherein each side panel can be slidably extended outward with respect to the back panel to define an extended position and wherein each side panel can be slidably extended inward with respect to the back panel to define a retracted position;

a rigid rectangular front panel of a length and a width generally equal to that of the back panel, the front panel having a smooth planar exterior surface and a smooth planar interior surface interconnected by a periphery formed of a long horizontal top edge, a long horizontal bottom edge, and a pair of side edges extended therebetween, a pair of integral parallel linear rails extended outwards from the interior surface thereof and at a position parallel with the side edges thereof, and a pair of horizontally aligned bores disposed thereon at a location offset from a central portion of the bottom edge wherein each bore is positioned in axial alignment with a separate bore on the back panel;

a rigid rectangular planar extension panel having a smooth planar first surface and a smooth planar second surface interconnected by a periphery formed of a long horizontal top edge, a long horizontal bottom edge, and a pair of side edges extended therebetween, a first pair of parallel linear slots formed thereon at a position parallel with the side edges thereof, and a second pair of parallel linear slots formed thereon at a position parallel with and between the first pair of slots and in axial alignment with the pairs of bores of the front panel and back panel, and wherein the extension panel is sandwiched between and in slidable contact with the second surfaces of the side panels and interior surface of the front panel and wherein the rails of the front panel are separately and slidably disposed within the slots of the first pair on the extension panel whereby the extension panel can be extended downward and away from the front panel and the back panel in an extended position and retracted toward the front panel and back panel in a retracted position;

a pair of rigid bolts disposed through the bores of the front panel and back panel and second pair of slots of the extension panel and with each bolt secured with a wing nut to hold the panels in a fixed position when the nuts are tightened and hold the panels in juxtaposition when the nuts are loosened; and deflector coupling means for pivotally coupling the back panel near the top edge thereof to a bed of a pickup truck at a location near the tailgate whereby the front panel and back panel extend across the bed such that the deflector can be positioned against the tailgate in a stowed configuration or positioned at an angle away from the tailgate in an operable configuration with the side panels and extension panels placed in an extended configuration for use.

2. A wind deflector apparatus for use in a bed of a pickup truck for reducing air pressure and wind drag forces created in the bed of the pickup truck when it is moving forward, comprising:

a generally rectangular planar back panel;

a generally rectangular planar front panel;

a pair of side panels slidably sandwiched between the back panel and front panel;

side panel coupling means for coupling the side panels between the back panel and front panel and yet allowing opposing and outward longitudinal slidable movement of the side panels with respect to both the front panel and back panel in an extended position for use in deflecting air and allowing inward longitudinal slidable movement of the side panels with respect to both the front panel and back panel in a retracted position for stowage; and deflector coupling means for pivotally coupling the back panel to a bed of a pickup truck at a location near the tailgate whereby the front panel and back panel extend across the bed such that the deflector can be positioned against the tailgate in a stowed configuration or positioned at an angle away from the tailgate in an operable configuration with the side panels placed in an extended configuration.

3. The wind deflector apparatus as set forth in claim 2 and further comprising:

a generally rectangular planar extension panel slidably sandwiched between the back panel and front panel; and extension panel coupling means for coupling the extension panels between the back panel and front panel and yet allowing downward transverse slidable movement of the extension panel with respect to both the front panel and back panel in an extended position for use in deflecting air and allowing upward transverse slidable movement of the extension panel with respect to both the front panel and back panel in a retracted position for stowage.

* * * * *